US012782625B2

(12) United States Patent
Park

(10) Patent No.: US 12,782,625 B2
(45) Date of Patent: Nov. 3, 2026

(54) POLARIZING PLATE AND OPTICAL DISPLAY DEVICE

(71) Applicant: SAMSUNG SDI CO., LTD., Yongin-si (KR)

(72) Inventor: Ji Hwan Park, Suwon-si (KR)

(73) Assignee: HOARDSUN HENGXIN(WUXI) MATERIALS CO., LTD., Wuxi (CN)

( * ) Notice: Subject to any disclaimer, the term of this patent is extended or adjusted under 35 U.S.C. 154(b) by 270 days.

(21) Appl. No.: 18/737,786

(22) Filed: Jun. 7, 2024

(65) Prior Publication Data

US 2024/0411074 A1 Dec. 12, 2024

(30) Foreign Application Priority Data

Jun. 8, 2023 (KR) ........................ 10-2023-0073237

(51) Int. Cl.
*G02B 5/30* (2006.01)
*G02B 1/14* (2015.01)

(52) U.S. Cl.
CPC .............. *G02B 5/3016* (2013.01); *G02B 1/14* (2015.01)

(58) Field of Classification Search
None
See application file for complete search history.

(56) References Cited

U.S. PATENT DOCUMENTS

2012/0161086 A1* 6/2012 Kim .......................... C08L 1/32 252/585
2013/0286329 A1 10/2013 Goto et al.
2015/0277006 A1* 10/2015 Takasago ............. C09K 19/601 349/194
2016/0146996 A1 5/2016 Takeda et al.
2024/0045127 A1* 2/2024 Zhao .................... G02B 5/3083

FOREIGN PATENT DOCUMENTS

| | | | |
|---|---|---|---|
| JP | H09318949 A | * 12/1997 | |
| KR | 20150113886 A | 10/2015 | |
| KR | 10-2020-0022032 A | 3/2020 | |
| KR | 10-2021-0100549 A | 8/2021 | |
| KR | 20210100549 A | * 8/2021 | ........... G02B 5/3016 |
| TW | 201142439 A | 12/2011 | |
| TW | 201239421 A | 10/2012 | |
| TW | 201345718 A | 11/2013 | |
| TW | 201418779 A | 5/2014 | |

OTHER PUBLICATIONS

Korean Office Action dated May 14, 2025, issued in corresponding Korean Patent Application No. 10-2023-0073237 (8 pages).
Taiwanese Office Action dated Jan. 22, 2025, issued in corresponding Taiwanese Patent Application No. 113121144 (4 pages).

* cited by examiner

*Primary Examiner* — Shan Liu
(74) *Attorney, Agent, or Firm* — Ricky Lam

(57) ABSTRACT

A polarizing plate and an optical display device including the same are disclosed. A polarizing plate includes a polarizer, and a first retardation layer laminated on a surface of the polarizer, the first retardation layer is a liquid crystal retardation layer, and the first retardation layer includes first regions on opposite end portions of the first retardation layer in a width direction, and a second region between the first regions, and each of the first regions has a tear strength lower than a tear strength of the second region.

15 Claims, 3 Drawing Sheets

POLARIZING PLATE AND OPTICAL DISPLAY DEVICE

CROSS-REFERENCE TO RELATED APPLICATION

The present application claims priority to and the benefit of Korean Patent Application No. 10-2023-0073237, filed on Jun. 8, 2023 in the Korean Intellectual Property Office, the entire disclosure of which is incorporated herein by reference.

BACKGROUND

1. Field

Aspects of embodiments of the present invention relate to a polarizing plate and an optical display device including the same.

2. Description of the Related Art

An antireflective polarizing plate has been used to suppress the degradation of visibility caused by the reflection of external light. In an example, a circular polarizing plate composed of a polarizer and a retardation layer is known as the antireflective polarizing plate. In the circular polarizing plate, the polarizer converts external light directed to an image display panel into linearly polarized light, which is converted into circularly polarized light by the retardation layer. The external light converted into the circularly polarized light is reflected from the surface of the image display panel, and, in that reflection, a direction of rotation of a polarization plane of the circularly polarized light is reversed, and, thus, the circularly polarized light is converted into the linearly polarized light by the retardation layer and then blocked by the following polarizer. As a result, the emission of the external light to the outside may be remarkably suppressed, thereby providing an antireflection effect.

A liquid crystal retardation layer may be used as the retardation layer. The liquid crystal retardation layer has an advantage of providing a thin thickness compared to a polymer retardation layer manufactured by stretching.

The background technology of the present invention is disclosed in Korean Patent Laid-open Publication No. 10-2015-0113886 and the like.

SUMMARY

According to an aspect of embodiments of the present invention, a polarizing plate with excellent manufacturing processability is provided.

According to another aspect of embodiments of the present invention, a polarizing plate in which both, or opposite, end portions of a liquid crystal retardation layer have an excellent appearance is provided.

An aspect of one or more embodiments of the present invention relates a polarizing plate.

According to one or more embodiments, a polarizing plate includes a polarizer, and a first retardation layer laminated on a surface of the polarizer, wherein the first retardation layer is a liquid crystal retardation layer, and the first retardation layer includes first regions on opposite end portions of the first retardation layer in a width direction, and a second region between the first regions, wherein each of the first regions has a tear strength less than a tear strength of the second region.

In one or more embodiments, the first regions may be liquid crystal non-alignment regions, and the second region may be a liquid crystal alignment region.

In one or more embodiments, a ratio of the tear strength of each of the first regions to the tear strength of the second region [(tear strength of each of the first regions)/(tear strength of the second region)] may be greater than 0 and less than or equal to 0.5.

In one or more embodiments, the tear strength of each of the first regions may be less than 0.10 N.

In one or more embodiments, the tear strength of the second region may be 0.10 N or more.

In one or more embodiments, if a total width of the first retardation layer is 100%, a ratio of a width of each of the first regions to the total width of the first retardation layer may be greater than 0% and less than or equal to 10%.

In one or more embodiments, each of the first regions may be a region having a width of 5 to 15 mm from an end portion of the first retardation layer.

In one or more embodiments, the first retardation layer may be a positive A-plate.

In one or more embodiments, the polarizing plate may further include an alignment film on a lower surface of the first retardation layer.

In one or more embodiments, the alignment film may include first portions corresponding to the first regions and a second portion corresponding to the second region.

In one or more embodiments, the first portions may be portions not treated for alignment, and the second portion may be a portion treated for alignment.

In one or more embodiments, the polarizing plate may further include an adhesive layer laminated on a surface of the first retardation layer.

In one or more embodiments, the polarizing plate may further include a second retardation layer having an in-plane retardation different from an in-plane retardation of the first retardation layer at a wavelength of 550 nm.

In one or more embodiments, the second retardation layer may be a positive C-plate.

In one or more embodiments, the polarizing plate may further include a protective layer.

According to one or more embodiments, an optical display device includes the above-described polarizing plate.

According to one or more embodiments, a polarizing plate with excellent manufacturing processability is provided.

According to one or more embodiments, a polarizing plate in which both, or opposite, end portions of a liquid crystal retardation layer have an excellent appearance is provided.

DETAILED DESCRIPTION

Figure 1:
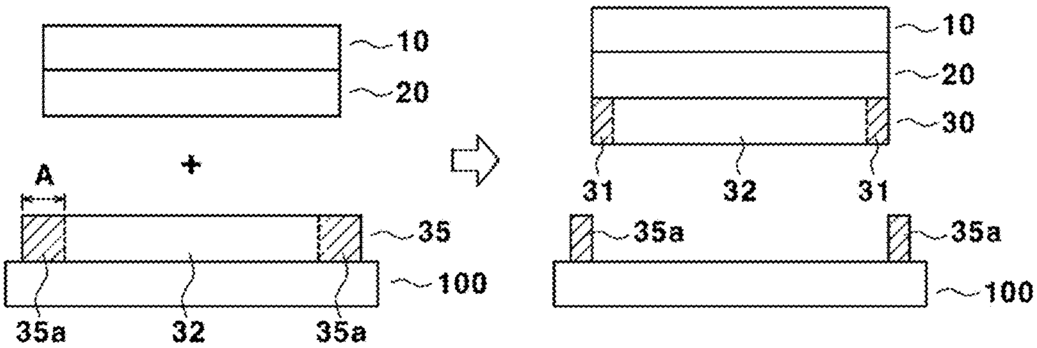
FIG. 1 is a view schematically illustrating a process of manufacturing a polarizing plate according to an embodiment.

Some embodiments of the present invention will be described in further detail with reference to the accompanying drawings, such that the present invention can be easily implemented by those skilled in the art. It is to be understood that the present invention may be implemented in different ways and is not limited to the embodiments described herein.

In the drawings, parts unrelated to the description may be omitted for clarity of description of the present invention, and like components will be denoted by like reference numerals throughout the specification. In the drawings, the length and size of each component are provided to describe the present invention; however, the present invention is not limited to the length and size of each component shown in the drawings. In the drawing, a dotted line indicates that two adjacent objects are integrated with each other.

The terms used in the present specification are used to describe example embodiments, and are not intended to limit the present invention. A singular expression includes a plural expression unless the context clearly indicates otherwise.

As used herein, "a combination thereof" refers to a mixture, a laminate, a composite, a copolymer, an alloy, a blend, a reaction product, and the like of components.

It is to be understood that the terms "comprises," "comprising," "includes," "including," "contains," "has," and/or "having," when used herein, specify the presence of stated features, numerals, operations, components, or combinations thereof, but do not preclude the presence or addition of one or more other numerals, operations, components, or combinations thereof.

In the present specification, the terms "above" and "below" are defined on the basis of the drawings, and "above" may be changed to "below," and "below" may be changed to "above" according to a viewing angle.

In the present specification, for an optical device, "front surface retardation (Re)" is represented by the following Equation A, "thickness direction retardation (Rth)" is represented by the following Equation B, and "degree of biaxiality (NZ)" is represented by the following Equation C.

$$Re=(nx-ny)\times d; \quad \text{Equation A}$$

$$Rth=\left((nx+ny)/2-nz\right)\times d; \quad \text{Equation B}$$

$$NZ=(nx-nz)/(nx-ny), \quad \text{Equation C}$$

where, in Equations A to C, nx, ny, and nz are indexes of refraction in a slow axis direction, a fast axis direction, and a thickness direction of the optical device at a measurement wavelength, respectively, and d is a thickness of the optical device (unit: nm).

The optical device may be a retardation layer, a protective layer, or a laminate thereof. Unless specifically stated, the retardation, the degree of biaxiality, and the thickness direction retardation refer to values measured by transmitting light in a normal direction with respect to an in-plane direction of the optical device.

In the present specification, an axis having a highest refractive index in the in-plane direction is defined as the "slow axis" and an axis having a lowest refractive index in the in-plane direction is defined as the "fast axis." In one or more embodiments, the slow axis and the fast axis may be substantially orthogonal to each other, but the present invention is not limited thereto.

In the present specification, when representing a numerical range, the expression "X to Y" means greater than or equal to X and less than or equal to Y (X≤ and ≤Y).

According to one or more embodiments, a polarizing plate includes a polarizer and a first retardation layer laminated on a surface of the polarizer, wherein the first retardation layer is a liquid crystal retardation layer, the first retardation layer has first regions at both, or opposite, end portions in a width direction, and a second region located between the first regions, and the first region has a lower tear strength than the second region.

The tear strength relationship indicates that a tear strength of the first region is less than that of the second region. The tear strength relationship may enable the polarizing plate to have excellent manufacturing processability by preventing or substantially preventing liquid crystal residue from scattering from both end portions of the first retardation layer and contaminating in a polarizing plate manufacturing process line when the first retardation layer, which is a liquid crystal retardation layer, is delaminated from a base film and the first retardation layer is transferred, during a polarizing plate manufacturing process. In addition, the tear strength relationship may improve an appearance of both end portions of the first retardation layer by enabling both end portions of the first retardation layer to be easily delaminated from the base film when the first retardation layer, which is a liquid crystal retardation layer, is delaminated from the base film during the polarizing plate manufacturing process.

The tear strength relationship is considered in that, when a width of an adhesive layer is less than a width of a layer for a first retardation layer in the polarizing plate manufacturing process of laminating an adherend (a laminate of an adhesive layer, and a polarizer or a polarizer and a protective layer) and a base film on which the layer for a first retardation layer is formed, and then transferring the first retardation layer to the adherend, contamination of the polarizing plate manufacturing process line may be prevented or substantially prevented, and the appearance of both end portions of the first retardation layer may be improved.

According to an embodiment, the first region may be a liquid crystal non-alignment region, and the second region may be a liquid crystal alignment region.

Herein, the description will be provided with respect to a case in which the first region is the liquid crystal non-alignment region and the second region is the liquid crystal alignment region. Accordingly, in the following description, the "liquid crystal non-alignment region" may be substantially the same as the "first region," and the "liquid crystal alignment region" may be substantially the same as the "second region." However, if both the first region and the second region are liquid crystal alignment regions, the first region and the second region may be included in the polarizing plate according to the present embodiment when the tear strength of the first region is less than the tear strength of the second region.

First, a polarizing plate manufacturing process will be described with reference to FIG. 1.

Referring to FIG. 1, a laminate for manufacturing a polarizing plate is manufactured by laminating an adhesive layer 20 and a polarizer 10 (although not shown in FIG. 1, a laminate of a polarizer and a protective layer is also possible instead of the polarizer 10).

Subsequently, a base film 100 having a layer 35 for a first retardation layer formed on an upper surface thereof is provided. A width of the adhesive layer 20 is less than a width of the layer 35 for a first retardation layer. The layer 35 for a first retardation layer includes liquid crystal non-alignment regions 35*a* at both, or opposite, end portions in a width direction, and a liquid crystal alignment region 32 located between the liquid crystal non-alignment regions 35*a*. Here, the "base film" is not particularly limited and may be a polymer film commonly used for transferring a liquid crystal retardation layer. For example, the base film may be a polyester-based film, such as a polyethylene terephthalate (PET) film. A width of the liquid crystal alignment region 32 is less than the width of the adhesive layer 20.

Subsequently, the adhesive layer 20 of the laminate for manufacturing a polarizing plate is laminated with the layer 35 for a first retardation layer.

Subsequently, the base film 100 is delaminated, and the liquid crystal alignment region 32 and some of the liquid crystal non-alignment regions 35*a* are transferred to a lower surface of the adhesive layer 20, thereby providing a polarizing plate in which the polarizer 10 or a laminate of a polarizer and a protective layer, the adhesive layer 20, and a first retardation layer 30 (including the liquid crystal alignment region 32 and liquid crystal non-alignment regions 31, which include some of the liquid crystal non-alignment regions 35*a*) are sequentially laminated.

By the delamination of the base film 100, residues of the liquid crystal non-alignment regions 35*a* are left on an upper surface of the base film 100.

The liquid crystal non-alignment region 35*a* has a lower tear strength than the liquid crystal alignment region 32. Thus, when the layer 35 for a first retardation layer is delaminated from the base film 100, the liquid crystal alignment region 32 of the layer 35 for a first retardation layer is easily delaminated from the base film 100. On the other hand, the portions 35*a* of the liquid crystal non-alignment regions 35*a*, which are not laminated with the adhesive layer 20, are not delaminated from the base film 100 and are left on the base film 100 due to their low tear strength and not being laminated with the adhesive layer 20, thereby improving the appearance of the first retardation layer 30 of the polarizing plate. In addition, since the portions of the liquid crystal non-alignment regions, which are not laminated with the adhesive layer, are not delaminated when the base film is delaminated, a problem in which the polarizing plate manufacturing process line is contaminated due to the scattering of liquid crystal residues can be prevented or substantially prevented.

According to an embodiment, the adhesive layer 20 may have substantially the same width as the first retardation layer 30.

Here, the "tear strength" is measured using a specimen made of a liquid crystal retardation layer alone or a specimen made of two layers of a liquid crystal retardation layer and an alignment film, and this measurement may be performed according to the following method for each of the first region and the second region.

Method of Measuring Tear Strength

Figure 6:
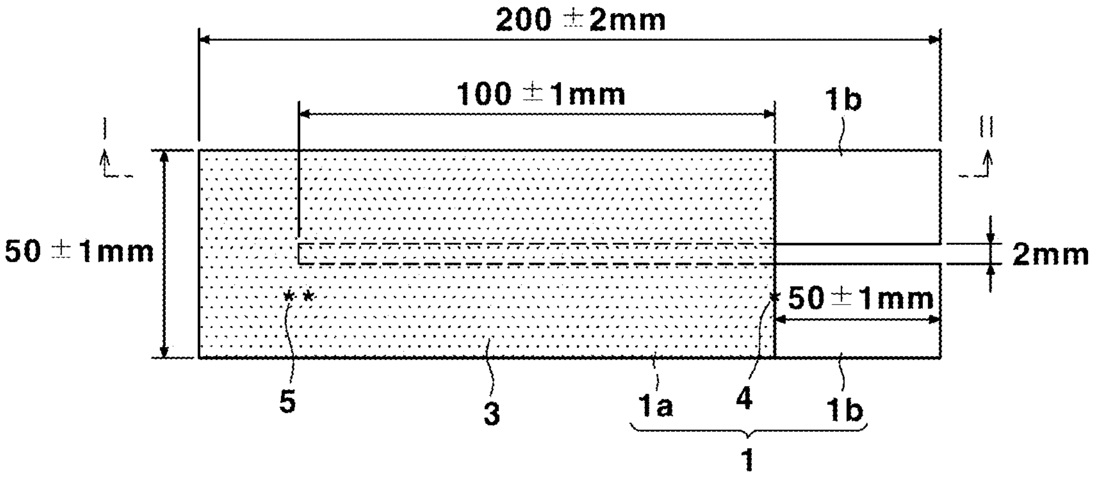
FIG. 6 is a plan view of a specimen for measuring tear strength.
Figure 7:
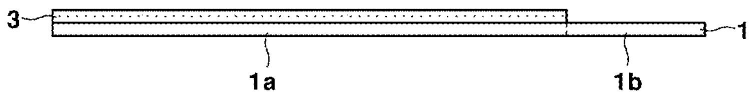
FIG. 7 is a cross-sectional view of the specimen for measuring tear strength taken along the line I-II of FIG. 6.

The tear strength may be measured according to KS K ISO 13937-2 (method of measuring tear strength using a trouser-shaped specimen, single tear method). Reference is made to FIGS. 6 and 7.

A specimen for the tear strength measurement was obtained by laminating a liquid crystal retardation layer 3 on a trouser-shaped base material (e.g., paper) 1. The base material 1 includes a region 1*a* in which the liquid crystal retardation layer 3 is laminated and regions 1*b* in which the liquid crystal retardation layer is not laminated. The base material 1 has a trouser shape by removing a rectangle with a length (150±2 mm) and a width (2 mm) from the center of a rectangle with a length (200±2 mm) and a width (50±1 mm) in a width direction. The liquid crystal retardation layer 3 has a rectangular shape with a length (150±2 mm) and a width (50±1 mm).

The specimen was mounted on a tensile test device (TA.XTplusC texture analyzer (Stable Micro Systems)), and two jigs (an upper jig and a lower jig) of the tensile test device are clamped onto the regions 1*b*, in which the liquid crystal retardation layer is not laminated, respectively. The specimen was aligned such that a cutting line of the specimen passed through a center line of the specimen, and, then, at 25° C., the regions 1*b* of the specimen, in which the liquid crystal retardation layer is not laminated, were vertically engaged with the jigs and gripped from a tear test start position 4 (*) to a tear test end position 5 () with a total gripping length of 100±1 mm. When the specimen was engaged with the test device, care was taken not to tear through the region that is solely composed of the liquid crystal retardation layer, leaving the uncut regions 1***b* free on the specimen. Care was taken to ensure that the tear runs parallel to the cut portion, and each crotch of the experimental specimen was oriented in a direction in which a force is applied. No initial load was applied when the test started. A device for recording tear strength was operated. By moving a moving clamp at a stretching rate of 300 mm/min, the experimental specimen was torn to a point marked at the end of the experimental specimen. After the completion of the test, an average of the maximum peaks from a first peak to a last peak was obtained. A first peak region was excluded from the calculation. Peaks that are suitable for the calculation were those exhibiting at least a 10% increase or decrease in strength.

According to an embodiment, in the first retardation layer, a ratio of the tear strength of the liquid crystal non-alignment region to the tear strength of the liquid crystal alignment region [(tear strength of liquid crystal non-alignment region)/(tear strength of liquid crystal alignment region)] may be greater than 0 and less than or equal to 0.5, for example, 0.1 to 0.5, 0.1 to 0.4, or 0.1 to 0.3. In the above range, the appearance of the first retardation layer of the polarizing plate can be improved even when the liquid crystal retardation layer is transferred, and a problem of contamination of the polarizing plate manufacturing process line due to scattering of the liquid crystal residue can be prevented or substantially prevented.

According to an embodiment, in the first retardation layer, the tear strength of the liquid crystal non-alignment region may be less than 0.10 N, for example, greater than or equal to 0 N and less than 0.10 N, 0.01 N to 0.08 N, 0.03 to 0.08 N, or 0.04 to 0.08 N. In the above range, a polarizing plate manufacturing process and a polarizing plate manufactured thereby can provide the effects described above.

According to an embodiment, in the first retardation layer, the tear strength of the liquid crystal alignment region may be greater than or equal to 0.10 N, for example, 0.10 N to 0.50 N, 0.20 N to 0.40 N, 0.25 to 0.30 N, or 0.25 to 0.27 N. In the above range, a bonding strength between liquid crystal molecules in the liquid crystal alignment region is excellent, thereby increasing reliability of the first retardation layer.

In FIG. 1, in the laminate of the base film 100 and the layer 35 for a first retardation layer, a width A of the liquid crystal non-alignment region 35*a* is not particularly limited, but, in an embodiment, may be 15 to 40 mm.

Although not shown in FIG. 1, in the base film 100 on which the layer 35 for a first retardation layer is formed, an alignment film may be further formed between the base film 100 and the layer 35 for a first retardation layer. The alignment film may facilitate the formation of the liquid crystal alignment region 32 and the liquid crystal non-alignment region 35*a*. This will be described in further detail below. According to an embodiment, the width of the layer 35 for a first retardation layer may be the same as a width of the alignment film.

The first retardation layer includes the liquid crystal non-alignment regions formed at both, or opposite, end portions in the width direction and the liquid crystal alignment region located between the liquid crystal non-alignment regions.

The liquid crystal alignment region may be a region in which liquid crystal molecules are aligned in a certain alignment direction (e.g., a predetermined alignment direction) and a certain tilt angle (e.g., a predetermined tilt angle). The liquid crystal alignment region may have an in-plane retardation of a certain range (e.g., a predetermined range) at a wavelength of 550 nm according to the alignment direction and the tilt angle. According to an embodiment, the polarizing plate may function as an antireflective polarizing plate due to the liquid crystal alignment region.

According to an embodiment, the liquid crystal alignment region may have an in-plane retardation of 100 to 200 nm, for example, 100 to 150 nm at a wavelength of 550 nm. According to another embodiment, the liquid crystal alignment region may have an in-plane retardation of greater than 200 nm and less than or equal to 300 nm, for example, 210 to 275 nm, at the wavelength of 550 nm. According to another embodiment, the liquid crystal alignment region may have an in-plane retardation of less than 100 nm, for example, 0 to 10 nm at the wavelength of 550 nm. In an embodiment, the liquid crystal alignment region may have an in-plane retardation of 100 to 200 nm, for example, 100 to 150 nm at the wavelength of 550 nm.

According to an embodiment, the liquid crystal alignment region may have a thickness direction retardation of less than 0 nm, for example, −60 to −30 nm. According to another embodiment, the liquid crystal alignment region may have a thickness direction retardation of greater than or equal to 0 nm, for example, 100 to 160 nm.

According to an embodiment, the liquid crystal alignment region may exhibit reverse wavelength dispersibility, forward wavelength dispersibility, or flat wavelength dispersibility as an optical property thereof. Here, "reverse wavelength dispersibility" means a gradual increase in in-plane retardation from a short wavelength to a long wavelength, "forward wavelength dispersibility" means a gradual decrease in in-plane retardation from the short wavelength to the long wavelength, and "flat wavelength dispersibility" means that the in-plane retardation has a substantially uniform value as it transitions from the short wavelength to the long wavelength. In an embodiment, the liquid crystal alignment region may have the reverse wavelength dispersibility. According to an embodiment, the liquid crystal alignment region may have a positive A-plate (nx>ny=nz), a negative A-plate (nx=nz>ny), a positive B-plate (nz>nx>ny), a negative B-plate (nx>ny>nz), a positive C-plate (nz>nx=ny), or a negative C-plate (nx=ny>nz). In an embodiment, the liquid crystal alignment region may have the positive A-plate. Here, nx, ny, and nz are indexes of refraction of the liquid crystal alignment region in the slow axis direction, the fast axis direction, and the thickness direction of the liquid crystal alignment region, respectively, at a wavelength of 550 nm.

According to an embodiment, the liquid crystal alignment region may include a cured product of a liquid crystal composition for a liquid crystal alignment region. The cured product of the liquid crystal composition may be formed by treating the liquid crystal composition by heat-curing, photo-curing, or a combination thereof.

The liquid crystal composition may include a polymerizable compound exhibiting liquid crystallinity by polymerization. The polymerizable compound may have one or more polymerizable cross-linking groups. For example, the polymerizable cross-linking group may be a photocurable cross-linking group, which may be an acrylate group, a methacrylate group, a vinyl group, a vinyl oxide group, an epoxy group, an oxetane group, a thiol group, a maleimide group, or a variation thereof.

The liquid crystal composition may further include a polymerizable compound that does not exhibit liquid crystallinity by polymerization but facilitates the formation of the first retardation layer. The polymerizable compound may have one or more polymerizable cross-linking groups. For example, the polymerizable cross-linking group may be an acrylate group, a methacrylate group, a vinyl group, a vinyl oxide group, an epoxy group, an oxetane group, a thiol group, a maleimide group, or a variation thereof.

The liquid crystal composition may further include a liquid crystal compound. The liquid crystal compound may not have one or more polymerizable cross-linking groups, but may facilitate the formation of the liquid crystal retardation layer by being included in the liquid crystal composition.

The liquid crystal composition may further include additives commonly included for implementing the liquid crystal retardation layer, such as a photoinitiator, a surface modifier, an antioxidant, and the like. The liquid crystal composition may further include a solvent to facilitate the manufacture of a liquid crystal layer having a uniform surface.

Even when the above-described liquid crystal alignment region is provided, the liquid crystal non-alignment region can improve the appearance of both end portions of the first retardation layer of the polarizing plate, and prevent or substantially prevent the problem of contamination of the polarizing plate manufacturing line due to the delamination of the portion of the liquid crystal non-alignment region, which is not laminated with the adhesive layer, and scattering of the liquid crystal residue when the base film is delaminated during the polarizing plate manufacturing process.

The liquid crystal non-alignment region may be a region in which liquid crystal molecules are not aligned in a certain alignment direction (e.g., a predetermined alignment direction) and a certain tilt angle (e.g., a predetermined tilt angle). Thus, the liquid crystal non-alignment region does not contribute to the in-plane retardation, wavelength dispersion, and optical characteristics of the first retardation layer. Instead, the liquid crystal non-alignment region can improve the appearance of both end portions of the first retardation layer of the polarizing plate, and prevent or substantially prevent the problem of contamination of the polarizing plate manufacturing line due to the delamination of the portion of the liquid crystal non-alignment region, which is not laminated with the adhesive layer, and scattering of the liquid crystal residue when the base film is delaminated during the polarizing plate manufacturing process.

In an embodiment, the liquid crystal non-alignment region may include a cured product of a liquid crystal composition for a liquid crystal non-alignment region. The cured product of the liquid crystal composition may be formed by treating the liquid crystal composition by heat-curing, photo-curing, or a combination thereof.

In an embodiment, the liquid crystal composition may include a polymerizable compound exhibiting liquid crystallinity by polymerization. The polymerizable compound may have one or more polymerizable cross-linking groups. For example, the polymerizable cross-linking group may a photocurable cross-linking group, which may be an acrylate group, a methacrylate group, a vinyl group, a vinyl oxide group, an epoxy group, an oxetane group, a thiol group, a maleimide group, or a variation thereof.

The liquid crystal composition may further include a polymerizable compound that does not exhibit liquid crystallinity by polymerization, but facilitates formation of the first retardation layer. In an embodiment, the polymerizable compound may have one or more polymerizable cross-linking groups. For example, the polymerizable cross-linking group may be an acrylate group, a methacrylate group, a vinyl group, a vinyl oxide group, an epoxy group, an oxetane group, a thiol group, a maleimide group, or a variation thereof.

The liquid crystal composition may further include a liquid crystal compound. The liquid crystal compound may not have one or more polymerizable cross-linking groups, but may facilitate the formation of the liquid crystal retardation layer by being included in the liquid crystal composition.

The liquid crystal composition may further include additives commonly included for implementing the liquid crystal retardation layer, such as a photoinitiator, a surface modifier, an antioxidant, and the like. The liquid crystal composition may further include a solvent to facilitate the manufacture of a liquid crystal layer having a uniform surface.

In an embodiment, if a total width of the first retardation layer 30 is 100%, a ratio of a width of the liquid crystal non-alignment regions formed at an end portion of the first retardation layer (in FIG. 2, a ratio of a width B of one liquid crystal non-alignment region 31 to a total width C of the first retardation layer 30 is B/C) may be greater than 0% and less than or equal to 10%, for example, 1% to 10%, or 2% to 8%. In the above range, the above-described effects can be implemented without affecting optical functions, including the function of preventing or substantially preventing reflection due to the liquid crystal alignment region in the polarizing plate.

According to an embodiment, the liquid crystal non-alignment region may be a region (B in FIG. 2) having a width of 5 to 15 mm, for example, 10 to 15 mm from one end portion of the first retardation layer 30. In the above range, the effects of the above-described implementations can be implemented.

According to an embodiment, the liquid crystal non-alignment region may be integrated with the liquid crystal alignment region. Here, the term "integration" may mean that a boundary surface between the liquid crystal non-alignment region and the liquid crystal alignment region is not entirely distinguished and remains in a non-flat state.

According to an embodiment, a liquid crystal composition for the liquid crystal alignment region and a liquid crystal composition for the liquid crystal non-alignment region are the same, and, thus, the first retardation layer may be manufactured by concurrently (e.g., simultaneously) forming the liquid crystal non-alignment region and the liquid crystal alignment region by a single coating of the liquid crystal composition for the liquid crystal non-alignment region (or the liquid crystal composition for the liquid crystal alignment region).

In an embodiment, a thickness of the first retardation layer may be greater than 0 μm and less than or equal to 10 μm, for example, 0.1 μm to 10 μm, or 0.5 μm to 5 μm. In the above range, a desired retardation can be implemented.

A manufacturing method of the first retardation layer is not limited as long as the first retardation layer can include the liquid crystal non-alignment region and the liquid crystal alignment region. However, to facilitate the formation of the first retardation layer, the first retardation layer may further include an alignment film on a lower surface thereof, that is, a surface thereof opposite to the polarizer.

The alignment film serves to align liquid crystal compounds in a desired direction. In addition, the alignment film may control the tear strength of each of the liquid crystal non-alignment region and the liquid crystal alignment region.

The alignment film may include first portions and a second portion. The first portions correspond to the liquid crystal non-alignment regions of the first retardation layer. The second portion is located between the first portions and corresponds to the liquid crystal alignment region of the first retardation layer.

The second portion is an alignment film that is treated for alignment, and may include a cured product of a coating film formed using a composition for forming an alignment film. This may facilitate the formation of the liquid crystal alignment region when the liquid crystal composition is coated on the second portion and cured.

In an embodiment, the first portion is an alignment film that is not treated for alignment, and may include a coating film formed of the composition for forming an alignment film but may include an uncured product which is not cured. This may facilitate the formation of the liquid crystal non-alignment region by allowing the liquid crystal to be cured in an unaligned state even when the liquid crystal composition is coated on the first portion and cured.

According to an embodiment, the first portion and the second portion of the alignment film may be integrated. Here, the term "integration" may mean that a boundary surface between the first portion and the second portion is not entirely distinguished and remains in a non-flat state.

According to an embodiment, the alignment film may form the first portion and the second portion by a single coating of the composition for forming an alignment film.

According to an embodiment, the alignment film may be a rubbing treatment film made of an organic compound, such as a polymer, an obliquely deposited film formed of an inorganic compound, a film having microgrooves, or a film obtained by layering Langmuir-Blodgett (LB) films prepared using organic compounds, such as tricosanoic acid, dioctadecylmethylammonium chloride, and methyl stearate, and the like. In an embodiment, the alignment film may be an alignment film or the like that exhibits an alignment function by irradiation with light. A composition for forming an alignment film may include polyimide, polyvinyl alcohol, modified polyvinyl alcohol, a polymer having a polymerizable group, or the like. The alignment treatment may be performed by rubbing the surface of a polymer layer, or by irradiating a photoalignment material with polarized light or non-polarized light, or by heating a coating film of the composition for forming the alignment film.

According to an embodiment, in the alignment film, the second portion and the first portion may be formed according to whether the first portion and the second portion are treated for alignment and/or by adjusting an alignment angle in the first portion and the second portion, when performing alignment treatment on the coating film formed by coating the composition for forming an alignment film. This provides a magnitude relationship in tear strength between the liquid crystal alignment region and the liquid crystal non-alignment region in the first retardation layer.

According to another embodiment, in the alignment film, the second portion may be formed by subjecting only a portion of the coating film, which is formed by coating the composition for forming an alignment film, to a heating treatment (heat-curing), and the first portion may be formed by not subjecting the remaining portion to the heating treatment (heat-curing). This facilitates a magnitude relationship in tear strength between the liquid crystal alignment region and the liquid crystal non-alignment region in the first retardation layer.

According to another embodiment, in the first retardation layer, the magnitude relationship in tear strength between the liquid crystal alignment region and the liquid crystal non-alignment region can be implemented by adjusting the type of the liquid crystal composition and/or the degree of photo-curing of the liquid crystal composition.

In an embodiment, the alignment film may have a thickness of greater than 0 μm and less than or equal to 1 μm, for example, 10 nm to 800 nm, or 100 nm to 600 nm. In the above range, a desired retardation can be implemented.

Polarizer

The polarizer converts incident natural light or polarized light into linearly polarized light in a specific direction, and may be manufactured from a polymer film having a polyvinyl alcohol-based resin as a main component. In an embodiment, the polarizer may be manufactured by dyeing the polymer film with iodine or dichroic dyes and stretching the dyed polymer film in a machine direction (MD), or manufactured by forming a polyene bond on the polymer film by a dehydration reaction using an acid catalyst or the like. In an embodiment, the polarizer may be manufactured through processes of swelling, dyeing, and stretching of a polyvinyl alcohol film, or, optionally, the polarizer may be manufactured through one or more processes, such as complementary-coloring and cross-linking of the polyvinyl alcohol film.

The polarizer has a light absorption axis and a light transmission axis in the in-plane direction, and the light absorption axis may be the MD of the polarizer, and the light transmission axis may be the transverse direction (TD) of the polarizer.

In an embodiment, the polarizer may have a total light transmittance of 40% or more, for example, 40% to 47%, and a degree of polarization of 99% or more, for example, 95% to 99.9999%. In the above range, the polarizer can improve antireflection performance when combined with the retardation layer. The "light transmittance" and the "degree of polarization" are values measured at a wavelength of 380 nm to 780 nm and values reflecting visual sensitivity in the corresponding wavelength range, and may be measured by conventional methods known to those skilled in the art.

In an embodiment, the polarizer may have a thickness of 2 to 30 μm, and, in an embodiment, 4 to 25 μm, and may be used in the polarizing plate in the above range.

The polarizing plate may further include an adhesive layer on an upper surface of the first retardation layer, that is, a surface on a side of the polarizer.

Adhesive Layer

The adhesive layer is laminated on a surface of the first retardation layer and adheres the first retardation layer to an adherend. Here, the "adherend" may include a polarizer, a protective layer to be described below, or another retardation layer to be described below.

According to an embodiment, the adhesive layer may be laminated on both the liquid crystal alignment region and the liquid crystal non-alignment region of the first liquid crystal retardation layer. In an embodiment, the adhesive layer may also be bonded to the liquid crystal non-alignment regions such that the appearance of both end portions of the first retardation layer may be improved through the liquid crystal non-alignment regions as shown in FIG. 1.

According to an embodiment, in terms of peel strength of the adhesive layer in FIG. 1, the peel strength between the adhesive layer and the layer for a first retardation layer or the layer for a first retardation layer and the alignment film may be greater than the peel strength between the base film and the layer for a first retardation layer or the layer for a first retardation layer and the alignment film. This may prevent or substantially prevent contamination of the polarizing plate manufacturing process line due to scattering of liquid crystal residue at both end portions of the first retardation layer upon delamination of the base film as shown in FIG. 1, and may improve the appearance at both end portions of the first retardation layer.

According to an embodiment, the adhesive layer may be a pressure sensitive adhesive layer. This can improve processability by providing high peeling force between the first retardation layer and the adherend, while also providing excellent re-peelability. According to an embodiment, the adhesive layer may include a (meth)acrylic-based, epoxy-based, silicone-based, urethane-based, or urethane (meth) acrylic-based adhesive resin, but the present invention is not limited thereto.

According to an embodiment, the adhesive layer may have a thickness of 2 to 30 μm, and, in an embodiment, 4 to 25 μm, and may be used in the polarizing plate in the above range.

The polarizing plate may further include a protective layer on at least one of an upper surface of the polarizer and a lower surface of the polarizer, for example, between the polarizer and the first retardation layer, and a lower surface of the first retardation layer. The polarizing plate may include one or more protective layers.

Protective Layer

The protective layer may provide additional functionality to the retardation layer and/or the polarizing plate. For example, the protective layer may increase durability and mechanical strength of the polarizing plate by supplementing the thickness of the polarizing plate. In an embodiment, the protective layer may prevent or substantially prevent iodine, which may be eluted from the polarizer after the polarizing plate is left at high temperature and humidity for a long period of time, from contaminating the retardation layer and/or a panel.

The protective layer is an optically transparent film, and, in an embodiment, may be a film made of one or more resins selected from among cellulose resins including triacetylcellulose (TAC) and the like, polyester resins including polyethylene terephthalate, polybutylene terephthalate, polyethylene naphthalate (PEN), polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins.

According to an embodiment, the protective layer may have a front surface retardation of 10 nm or less, for example, 0 nm to 5 nm at a wavelength of 550 nm. In the above range, the effect of using the protective layer can be achieved without affecting the effect of reducing reflectivity at a front surface and a side surface by the liquid crystal retardation layer.

In an embodiment, the protective layer may have a thickness of 5 to 100 μm, and, in an embodiment, 15 to 45 μm, and may be used in the polarizing plate in the above range.

The polarizing plate may further include a second retardation layer on at least one of the upper surface of the polarizer and the lower surface of the polarizer, for example, between the polarizer and the first retardation layer, and the lower surface of the first retardation layer. The second retardation layer may refer to a layer with a different retardation value or different optical characteristics at a wavelength of 550 nm as compared to the first retardation layer, and, in an embodiment, the liquid crystal alignment region of the first retardation layer. The polarizing plate may include one or more second retardation layers.

Second Retardation Layer

According to an embodiment, the second retardation layer may have an in-plane retardation of less than 100 nm, for example, 0 to 10 nm at a wavelength of 550 nm. According to another embodiment, the second retardation layer may have an in-plane retardation of 100 to 200 nm, for example, 100 to 150 nm at the wavelength of 550 nm. According to another embodiment, the second retardation layer may have an in-plane retardation of greater than 200 nm and less than or equal to 300 nm, for example, 210 to 275 nm at the wavelength of 550 nm.

According to an embodiment, the second retardation layer may have a thickness direction retardation of less than 0 nm, for example, −60 to −30 nm. According to another embodiment, the second retardation layer may have a thickness direction retardation of greater than or equal to 0 nm, for example, 100 to 160 nm.

According to an embodiment, the second retardation layer may exhibit reverse wavelength dispersibility, forward wavelength dispersibility, or flat wavelength dispersibility as an optical property thereof.

According to an embodiment, the second retardation layer may be a positive A-plate, a negative A-plate, a positive B-plate, a negative B-plate, a positive C-plate, or a negative C-plate as an optical property thereof. In an embodiment, the second retardation layer may be a positive C-plate.

According to an embodiment, the second retardation layer may be a liquid crystal layer or a non-liquid crystal layer. The liquid crystal layer is a layer formed of a liquid crystal composition and may be made of conventional liquid crystals known to those skilled in the art. The non-liquid crystal layer may be a stretched film manufactured by stretching an unstretched film manufactured by melt extrusion or solvent casting of a polymer-containing composition or a coating layer manufactured by coating the polymer-containing composition.

According to an embodiment, the second retardation layer may have a thickness of less than 3.5 μm, for example, 0.5 to 3.4 μm. In the above range, a desired retardation can be implemented.

Figure 2:
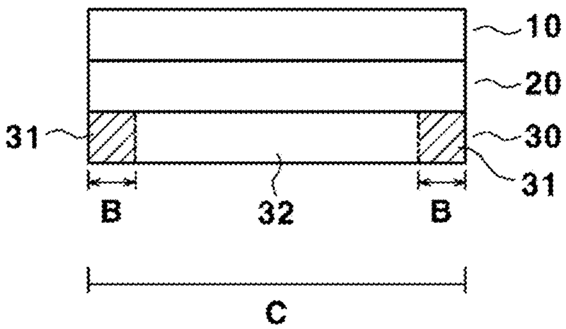
FIG. 2 is a view schematically illustrating a structure of a polarizing plate according to an embodiment.

FIG. 2 is a cross-sectional view of a polarizing plate according to an embodiment. Referring to FIG. 2, the polarizing plate includes a polarizer 10, and an adhesive layer 20 and a first retardation layer 30 sequentially laminated on a lower surface of the polarizer 10. The first retardation layer 30 includes liquid crystal non-alignment regions 31 formed on both, or opposite, end portions thereof in a width direction, and a liquid crystal alignment region 32 located between the liquid crystal non-alignment regions 31.

Figure 3:
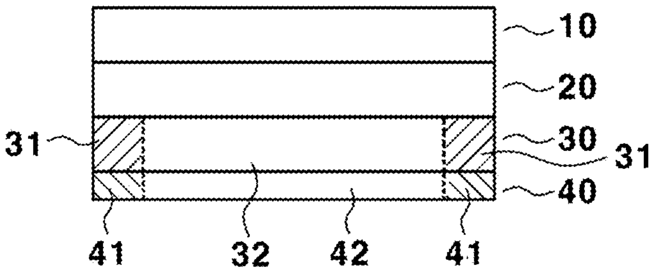
FIG. 3 is a view schematically illustrating a structure of a polarizing plate according to another embodiment.

FIG. 3 is a cross-sectional view of a polarizing plate according to another embodiment. Referring to FIG. 3, the polarizing plate includes a polarizer 10, and an adhesive layer 20, a first retardation layer 30, and an alignment film 40 sequentially laminated on a lower surface of the polarizer 10. The first retardation layer 30 includes liquid crystal non-alignment regions 31 formed on both, or opposite, end portions thereof in the width direction, and a liquid crystal alignment region 32 located between the liquid crystal non-alignment regions 31. The alignment film 40 includes first portions 41 corresponding to the liquid crystal non-alignment regions 31 and a second portion 42 corresponding to the liquid crystal alignment region 32.

Figure 4:
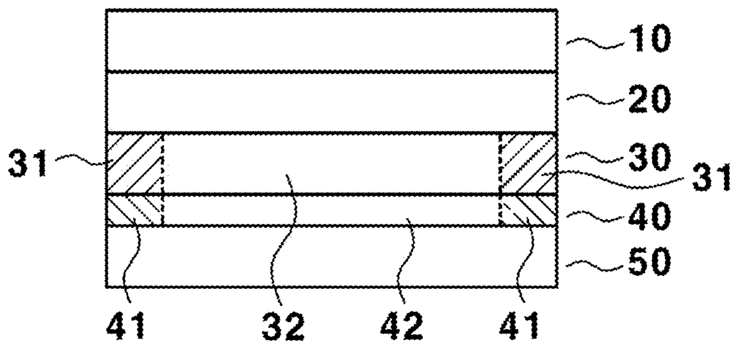
FIG. 4 is a view schematically illustrating a structure of a polarizing plate according to another embodiment.

FIG. 4 is a cross-sectional view of a polarizing plate according to another embodiment. Referring to FIG. 4, the polarizing plate includes a polarizer 10, and an adhesive layer 20, a first retardation layer 30, an alignment film 40, and a second retardation layer 50 sequentially laminated on a lower surface of the polarizer 10. The first retardation layer 30 includes liquid crystal non-alignment regions 31 formed on both, or opposite, end portions thereof in the width direction, and a liquid crystal alignment region 32 located between the liquid crystal non-alignment regions 31. The alignment film 40 includes first portions 41 corresponding to the liquid crystal non-alignment regions 31 and a second portion 42 corresponding to the liquid crystal alignment region 32.

Figure 5:
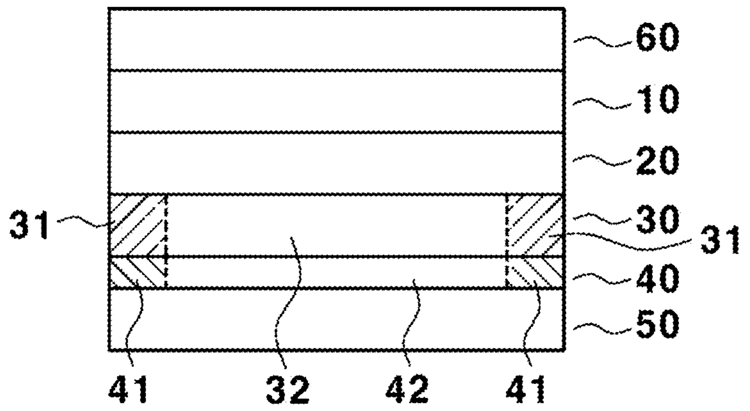
FIG. 5 is a view schematically illustrating a structure of a polarizing plate according to another embodiment.

FIG. 5 is a cross-sectional view of a polarizing plate according to another embodiment. Referring to FIG. 5, the polarizing plate includes a polarizer 10, a protective layer 60 laminated on an upper surface of the polarizer 10, and an adhesive layer 20, a first retardation layer 30, an alignment film 40, and a second retardation layer 50 sequentially laminated on a lower surface of the polarizer 10. The first retardation layer 30 includes liquid crystal non-alignment regions 31 formed on both, or opposite, end portions thereof in the width direction, and a liquid crystal alignment region 32 located between the liquid crystal non-alignment regions 31. The alignment film 40 includes first portions 41 corresponding to the liquid crystal non-alignment regions 31 and a second portion 42 corresponding to the liquid crystal alignment region 32.

An optical display device according to one or more embodiments of the present invention includes the polarizing plate according to an embodiment of the present invention. In an embodiment, the optical display device may include any of an organic light-emitting diode (OLED) display device and a liquid crystal display device.

In an embodiment, the OLED display device may include an OLED panel including a flexible substrate, and the polarizing plate according to an embodiment of the present invention laminated on the OLED panel. In another embodiment, the OLED display device may include an OLED panel including a non-flexible substrate, and the polarizing plate according to an embodiment of the present invention laminated on the OLED panel.

Herein, a configuration and operation of the present invention will be described in further detail through some examples of the present invention. However, it is to be understood that these examples are provided as examples of the present invention and are not to be construed in any way as limiting the scope of the present invention.

Example 1

A polyvinyl alcohol film (TS #20, Kuraray Co., Ltd., Japan, thickness: 20 μm) was stretched six times in an iodine aqueous solution of 55° C. to prepare a polarizer with a total light transmittance of 45%.

A polyethylene terephthalate (PET) film was prepared as a base film, and a composition for forming an alignment film (including a phenolic modified resin and a phenolic group-containing acrylate monomer, DNP Co., Ltd.) was applied to an upper surface of the PET film to a predetermined thickness to form a coating film, and only the remaining portion of the coating film excluding both end portions was treated for alignment at a predetermined alignment angle using a mask and then heat-cured to form an alignment film.

A composition for forming a liquid crystal retardation layer (including a photocurable melamine-based resin, DNP Co., Ltd.) was applied to the entire surface of the alignment film to a predetermined thickness and photo-cured to form a liquid crystal retardation layer, thereby preparing a laminate in which the base film, the alignment film, and the liquid crystal retardation layer are sequentially laminated.

An acrylic-based pressure-sensitive adhesive composition (PSA) was applied to a lower surface of the polarizer and cured to form an adhesive layer. The prepared adhesive layer was laminated with the liquid crystal retardation layer of the laminate. In this case, a width of the adhesive layer is less than a width of the liquid crystal retardation layer. After the lamination, the base film was delaminated, thereby manufacturing a polarizing plate in which the polarizer, the adhesive layer, the liquid crystal retardation layer, and the alignment film are laminated in this order. The liquid crystal retardation layer was a positive A-plate, and an in-plane retardation at a wavelength of 550 nm was 125 nm.

A liquid crystal retardation layer (positive C-plate) was laminated on a lower surface of the alignment film to manufacture a polarizing plate in which the polarizer, the adhesive layer, the liquid crystal retardation layer (positive A-plate), the alignment film, and the liquid crystal retardation layer (positive C-plate) are laminated in this order.

Examples 2 to 4

Polarizing plates were manufactured in the same manner as in Example 1, except that the type and/or photo-curing degree of the composition for forming a liquid crystal retardation layer was changed compared to Example 1.

Comparative Example 1

A polarizing plate was manufactured in the same manner as in Example 1, except that the entire coating film was treated for alignment at a predetermined alignment angle without using a mask, and then heat-cured to prepare an alignment film.

The following properties were evaluated by using the polarizing plates of the Examples and Comparative Example 1, and are shown in Table 1 below, and FIGS. 8 and 9.

1) Tear strength (unit: N): Tear strength was measured for the laminate of the liquid crystal retardation layer (positive A-plate) and the alignment film, before the adhesive layer was laminated with the laminate. The tear strength was measured in the same manner for each of a liquid crystal alignment region and a liquid crystal non-alignment region. The tear strength was measured according to KS K ISO 13937-2, with reference to FIGS. 6 and 7, using the above-described method.

2) Appearance of both end portions of liquid crystal retardation layer (positive A-plate): A cross-section of both end portions of the liquid crystal retardation layer (positive A-plate) in the manufactured polarizing plate was visually evaluated for smoothness and uniformity. When the cross-section of both end portions of the positive A-plate was smooth and uniform, appearance was evaluated as good, and otherwise as poor.

3) Whether residue of liquid crystal retardation layer (positive A-plate) was left on base film: The base film was laminated in the process of manufacturing the polarizing plate in the Examples and Comparative Example 1, and then whether a residue of the liquid crystal retardation layer was left on the base film or scattered was evaluated. When the residue of the liquid crystal retardation layer was left on the base film or scattered, whether there was residue was evaluated as poor, and otherwise as good.

TABLE 1

| | | Example | | | | Comparative Example |
|---|---|---|---|---|---|---|
| | | 1 | 2 | 3 | 4 | 1 |
| Tear strength (N) | Liquid crystal alignment region | 0.27 | 0.27 | 0.27 | 0.27 | 0.27 |
| | Liquid crystal non-alignment region | 0.08 | 0.05 | 0.07 | 0.04 | — |
| Appearance | | Good | Good | Good | Good | Poor |
| Whether there was residue | | Good | Good | Good | Good | Poor |

As shown in Table 1, the appearance of both end portions of the liquid crystal retardation layer was excellent, and the residue was not present in the liquid crystal retardation layer (positive A-plate) of the base film and not scattered, such that manufacturing processability of the polarizing plate was excellent. On the other hand, in the polarizing plate of Comparative Example 1, the appearance of both end portions of the liquid crystal retardation layer was poor, and there was a significant amount of residue, and, thus, the effect of the embodiments of the present invention could not be achieved.

Figure 8:
FIG. 8 is a cross-sectional image of a liquid crystal retardation layer (positive A-plate) and an adhesive layer of an example according to an embodiment.
Figure 9:
FIG. 9 is a cross-sectional image of a liquid crystal retardation layer (positive A-plate) and an adhesive layer of a comparative example.

As shown in FIG. 8, the cross-section of the liquid crystal retardation layer and the adhesive layer of Example 1 was smooth and uniform. However, as shown in FIG. 9, the cross-section of the liquid crystal retardation layer and the adhesive layer of Comparative Example 1 was not uniform.

While some example embodiments have been described herein, it will be understood by those skilled in the art that modifications or changes to the embodiments can be easily performed, and, thus, it is to be understood that such modifications or changes are included in the scope of the present invention.

What is claimed is:

1. A polarizing plate comprising:

a polarizer; and a first retardation layer laminated on a surface of the polarizer, wherein the first retardation layer is a liquid crystal retardation layer, and the first retardation layer comprises first regions on opposite end portions of the first retardation layer in a width direction, and a second region between the first regions, wherein each of the first regions has a tear strength less than a tear strength of the second region, and wherein a ratio of the tear strength of each of the first regions to the tear strength of the second region [(tear strength of each of the first regions)/(tear strength of the second region)] is greater than 0 and less than or equal to 0.5.

2. The polarizing plate as claimed in claim 1, wherein the first regions are liquid crystal non-alignment regions, and the second region is a liquid crystal alignment region.

3. The polarizing plate as claimed in claim 1, wherein the tear strength of each of the first regions is less than 0.10 N.

4. The polarizing plate as claimed in claim 1, wherein the tear strength of the second region is 0.10 N or more.

5. The polarizing plate as claimed in claim 1, wherein, if a total width of the first retardation layer is 100%, a ratio of a width of each of the first regions to the total width of the first retardation layer is greater than 0% and less than or equal to 10%.

6. The polarizing plate as claimed in claim 1, wherein each of the first regions is a region having a width of 5 to 15 mm from an end portion of the first retardation layer.

7. The polarizing plate as claimed in claim 1, wherein the first retardation layer is a positive A-plate.

8. The polarizing plate as claimed in claim 1, further comprising an alignment film on a lower surface of the first retardation layer.

9. The polarizing plate as claimed in claim 8, wherein the alignment film comprises first portions corresponding to the first regions, and a second portion corresponding to the second region.

10. The polarizing plate as claimed in claim 9, wherein the first portions are portions not treated for alignment, and the second portion is a portion treated for alignment.

11. The polarizing plate as claimed in claim 1, further comprising an adhesive layer laminated on a surface of the first retardation layer.

12. The polarizing plate as claimed in claim 1, further comprising a second retardation layer having an in-plane retardation different from an in-plane retardation of the first retardation layer at a wavelength of 550 nm.

13. The polarizing plate as claimed in claim 12, wherein the second retardation layer is a positive C-plate.

14. The polarizing plate as claimed in claim 1, further comprising a protective layer.

15. An optical display device comprising the polarizing plate as claimed in claim 1.

* * * * *